Figure 1:
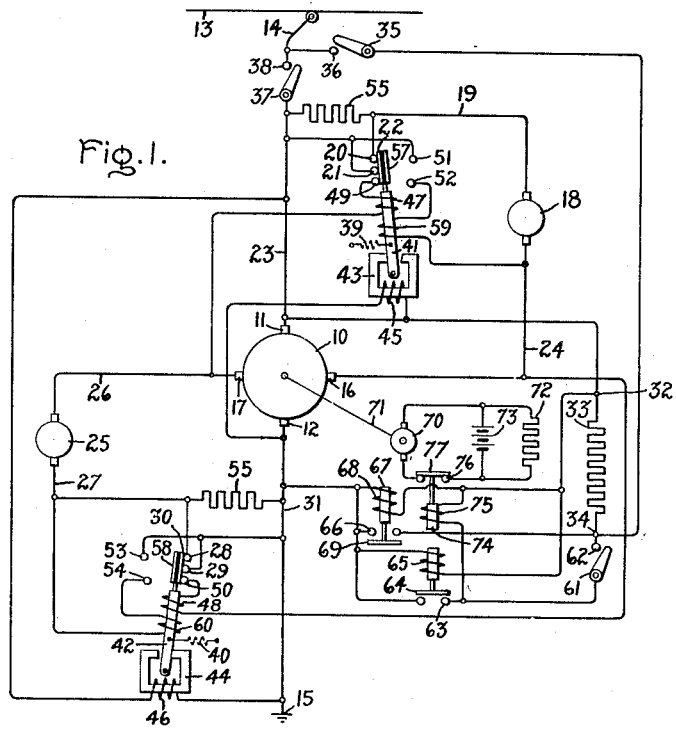

May 12, 1942. J. M. PESTARINI 2,282,822

POWER SYSTEM INCLUDING ROTARY TRANSFORMER

Filed Feb. 26, 1941

Inventor:
Joseph M. Pestarini,
by Harry E. Dunham
His Attorney.

Patented May 12, 1942

2,282,822

UNITED STATES PATENT OFFICE 2,282,822

POWER SYSTEM INCLUDING ROTARY TRANSFORMER

Joseph M. Pestarini, Turin, Italy

Application February 26, 1941, Serial No. 380,656

20 Claims. (Cl. 172—239)

My invention relates to power systems including direct-current rotary transformers of the metadyne type, and more particularly to power systems wherein the driving motors are connected between the primary and secondary brushes of the rotary metadyne transformer.

Various systems have been devised for providing the smoother acceleration of direct-current motors adapted to be connected substantially across the source of electrical power supply through a device which inherently regulates the electrical potential and current of the motors during acceleration and running and which also utilizes motors to provide a retarding force. It has been found that these characteristics can readily be obtained in a power system using a metadyne rotary transformer connected to the source of power supply with a proper arrangement for connecting the driving motors across a brush of the transformer primary brushes and a brush of the transformer secondary brushes. This general type of system has been described in considerable detail in my United States Patent No. 1,969,699, and various modifications and improvements are disclosed in my United States Patents 2,055,304; 2,059,024; 2,138,666; and 2,138,667.

A direct-current machine of the metadyne type is a dynamo-electric machine which may be operated as a motor, a generator, or a rotary transformer. Essentially, a metadyne is a direct-current dynamo-electric machine having a rotor or armature provided with windings and a commutator of the conventional direct-current dynamo-electric machine type, and is provided with a stationary member affording a path of low magnetic reluctance to the magnetic flux set up by the armature currents. A metadyne transformer is a direct-current rotary transformer adapted to transform a substantially constant voltage and variable current into a substantially constant current and variable voltage. The commutator of a bipolar metadyne machine usually is provided with two brush sets electrically displaced from each other for providing a primary circuit and a secondary circuit through the metadyne rotatable member or armature. The stationary member of the metadyne also may be provided with various field exciting windings arranged to provide the metadyne with special characteristics and to insure the stability of the machine. In certain applications, it has been found desirable to connect a part of the load across a primary brush and a secondary brush and another part of the load across the other primary brush and the other secondary brush. Such an arrangement provides two loop circuits through the metadyne armature, including an external load in each loop, and has been termed an "8-connection." This connection has been found particularly desirable for traction equipment where the motors may be used to provide a retarding or braking force to the driven vehicle by regenerative or dynamic braking. One of the difficulties which has been encountered with such an arrangement is to insure against the generation of too high a voltage by the motors during regenerative braking, and also to provide for the absorption of the power generated by the motors during braking periods when the connection is broken between the transformer primary brushes and the source of electrical power supply.

An object of my invention is to provide a power system having an arrangement to insure the absorption of the power generated by the motors during braking in case the connection is broken between the primary brushes of the metadyne transformer and the source of electrical power supply.

Another object of my invention is to insure against the application of excessive voltages in such a system to the metadyne transformer brushes by the motors during regenerative braking.

Still another object of my invention is to provide for the absorption of the power generated by the driving motors in such a system during regenerative braking if the voltage across the transformer primary brushes exceeds a predetermined value.

A further object of my invention is to provide for the removal of any auxiliary loads on the metadyne transformer in such a system when the voltage across the metadyne transformer primary brushes falls below a predetermined value.

A still further object of my invention is to insure against undesirable electric current surges when connecting this type system to the source of electrical power supply.

Further objects and advantages of my invention will become apparent and my invention will be better understood from the following description referring to the accompanying drawing, and the features of novelty which characterize my invention will be pointed out with particularity in the claims annexed to and forming part of this specification.

Figure 2:
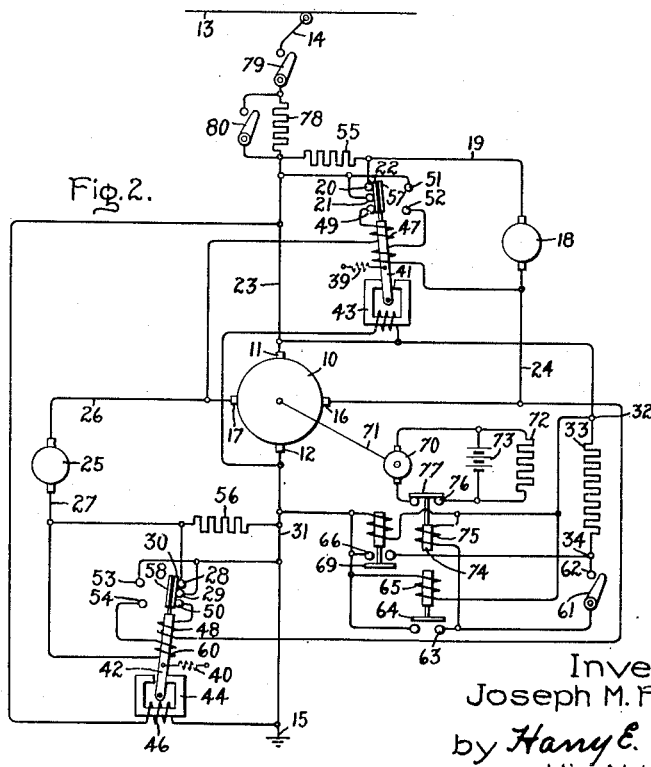

In the drawing, Fig. 1 illustrates a metadyne transformer adapted to supply power to driving motors connected to the transformer in "figure 8" connection and including braking resistors and an arrangement for connecting these resistors to provide the desired operating characteristics to the system; and Fig. 2 illustrates a modification of the system shown in Fig. 1, wherein a separate starting resistor is provided to insure against undesirable electric current surges during starting conditions.

Referring to the drawing, I have shown a power system particularly adaptable for use in driving traction vehicles. In Fig. 1, an armature reaction excited dynamo-electric machine, such as a rotary metadyne transformer 10, having an armature and a commutator, is provided with a pair of primary brushes 11 and 12. These primary brushes are connected across the source of electrical power supply, and the brush 11 is adapted to be connected to a trolley wire or third rail 13 through a contactor or trolley 14, and the primary brush 12 is connected to ground at 15. The metadyne transformer also is provided with a pair of secondary brushes 16 and 17 electrically displaced about the commutator from the primary brushes 11 and 12. An electrical load comprising a motor 18 is connected to the primary brush 11 through conductor 19 and the contacts 20 and 21 and contactor 22 of a polarized relay and conductor 23 to the primary brush 11 and by conductor 24 to the secondary brush 16. Another electrical load comprising a driving motor 25 is connected by a conductor 26 to the secondary brush 17 and through a conductor 27 and contacts 28 and 29 and contactor 30 of a polarized relay and conductor 31 to the other primary brush 12 of the set of metadyne transformer primary brushes. This forms two load loops including a driving motor connected in each of the load loops between a primary brush and a secondary brush of the metadyne transformer primary and secondary brush sets. As explained above, this type of system has been termed an "8-connected" metadyne system.

In starting this type of power system, it is desirable to avoid excessively large current surges when the metadyne transformer is connected to the source of electrical power supply, and in order to overcome or limit such current surges, one terminal 32 of a main load absorbing resistor 33 is connected to the primary brush 11 and the other terminal 34 of the resistor 33 is connected to a starting contactor 35 which is adapted to be closed upon a contact 36 to connect the primary brush 11 through the resistor 33 to the source of electrical power supply 13. When the contactor 35 is closed upon the contact 36, so as to provide a complete circuit from the trolley wire 13 through the trolley 14, and the main load absorbing resistor 33 to the primary brush 11, a very reduced voltage is impressed across the metadyne transformer primary brushes 11 and 12, thus limiting the current which tends to flow through the system. Under these conditions, a reduced voltage is applied across the driving motors 18 and 25 between the brushes 11 and 16 and 17 and 12, respectively, and these motors will accelerate at a desirable gradually increasing rate. The metadyne transformer also will accelerate, and when the speed thereof has attained a predetermined value, a contactor 37 will be closed upon a contact 38, thus connecting the primary brush 11 directly to the source of electrical power supply, and the contactor 35 will be opened, so as to break the circuit including the main load absorbing resistor 33. Under these conditions, full line voltage will be impressed across the primary brushes 11 and 12 of the metadyne transformer. The driving motors 18 and 25 will remain connected across the metadyne transformer brushes, as described above, as biasing springs 39 and 40 are arranged on the polarized relays to maintain the contactors 22 and 30 in engagement with the contacts 20 and 21, and 28 and 29, respectively. With this connection, the electrical potentials of the secondary brushes 16 and 17 referred to ground or any other relatively fixed value at the beginning of the starting period are substantially equal and the potentials between the brushes 11 and 16, and 17 and 12 are substantially one-half of the voltage between the brushes 11 and 12. As the motors increase in speed, the potentials of brushes 16 and 17 gradually change relatively to each other and to ground potential with the voltage of 16 decreasing and that of 17 increasing relatively to ground potential until the potential of the secondary brush 16 becomes substantially equal to that of the primary brush 12, which is ground potential, and the potential of the secondary brush 17 becomes substantially equal to that of the primary brush 11, which is the voltage of the trolley line 13. When the load connected in the load loop between the brushes 11 and 16 is substantially equal to the load connected in the load loop between the brushes 12 and 17, the voltage between these sets of brushes is substantially the same, and the voltage between the brushes 11 and 17 and the brushes 12 and 16 also is substantially the same. This operation has been fully described in my above-mentioned patents, and particularly in my United States Patent 1,969,699.

With this type system, it is desirable that the traction motors be adapted to provide a retarding or braking force to assist in stopping the vehicle. The above-mentioned connection may be maintained for regenerative braking, providing the voltage of the driving motors does not exceed the voltage of the source of electrical power supply; that is, providing the voltage of the driving motors does not exceed by too great a value the voltage impressed by the line across the primary brush and the secondary brush to which they are connected. It is quite possible, however, that the voltage generated by the traction motors may exceed this predetermined value, and in order to maintain the stability of the system, it is desirable to provide an emergency load absorbing device which may be connected between the traction motor and the primary brush of the metadyne transformer when the voltage across the traction motor exceeds a predetermined value. In order to obtain this result, the polarized relays are provided with armatures 41 and 42 which are biased in one direction by the springs 39 and 40 and are also biased in this direction by a magnetic attractive force exerted thereon by cores of magnetic material 43 and 44 which are excited by exciting coils 45 and 46, respectively, connected between the primary brushes 11 and 12. As shown in Fig. 1, the armatures 41 and 42 are excited by coils 47 and 48 connected across the brushes 17 and 11 and 16 and 12, respectively. The connections of these coils to the primary brushes 11 and 12 are made through contacts 49 and 50, the contactors 22 and 30, and the contacts 21 and 29, respectively, so that one terminal of the coil 47 is connected from the secondary brush 17 and the other terminal thereof is connected to the primary brush 11 through the contact 49, the contactor 22, the contact 21, and the conductor 23, while one terminal of the coil 48 is connected to the secondary brush 16 and the other terminal thereof is connected to the primary brush 12 through the contact 50, the contactor 30, the contact 29, and the conductor 31. These coils 47 and 48 are thus connected, so that they will be responsive to the voltage between the primary brush and the secondary brush across which no load loop is connected and the voltages thereacross are inversely proportional to the voltages of the respective load loops. When the voltage across the load loop remains below the line voltage, the potential between the brushes across which the exciting coils 47 and 48 are connected is such that a current flows through these coils to provide a magnetic excitation to the armatures 41 and 42 which is in such a direction as to bias the armature in the same direction as the magnetic attractive force of the cores 43 and 44 as energized by the coils 45 and 46, respectively. However, when the voltage across the load loops becomes greater than the line voltage, the potential of the secondary brushes becomes greater than the potential of the primary brushes to which these exciting coils are connected with the result that the current through these coils 47 and 48 is reversed and the excitation of the armatures 41 and 42 also is reversed. This reversal of the magnetic excitation of the armatures of the polarized relays acts in such a direction that the armatures 41 and 42 are urged in the opposite direction from that shown in Fig. 1, thereby opening the circuit between the contacts 20 and 21 between the contacts 28 and 29 and closing a circuit between a pair of contacts 51 and 52 and another pair of contacts 53 and 54 on the two relays. The opening of the above-mentioned circuits inserts emergency load absorbing resistors 55 and 56 in the circuits between the driving motors 18 and 25 and the primary brushes 11 and 12, respectively. The current which then flows from the motors through these emergency load absorbing resistors causes a voltage drop thereacross with the result that the voltage of the driving motors across the transformer brushes again is restored to a normal value below that of the source of electrical power supply. Under these conditions, exciting coils 47 and 48 on the polarized relays would tend to close the circuits between the contacts 20 and 21 of the contacts 28 and 29, respectively, thereby short-circuiting the emergency load absorbing resistors 55 and 56. This, however, might result in an undesirable oscillating operation of the polarized relays and considerable hunting of the motors with a resultant unstable operation of the system. In order to obviate this undesirable condition, contactors 57 and 58 on the polarized relays are adapted to close a circuit between the pairs of contacts 51 and 52 and 53 and 54, so as to energize holding coils 59 and 60, respectively, which excite the armatures 41 and 42 in such a direction as to maintain closed the energizing circuit of these holding coils and maintain open the short-circuiting circuit around the emergency braking resistors 55 and 56. The polarized relays function in this manner only during regenerative braking when the vehicle may be operating at excessively high speeds, so that the voltage of the driving motors exceeds a predetermined value.

Under certain circumstances, as when contact may be lost between the power system and the source of electrical power supply if the trolley 14 becomes disconnected from the trolley wire or third rail 13, it is desirable that a braking force may still be obtained by use of the traction motors as generators. Under these conditions, dynamic braking is provided by connecting the main load absorbing resistor 33 directly across the primary brushes 11 and 12 of the metadyne transformer, so that the power generated by the traction motors will be dissipated in the main load absorbing resistor 33. Thus, whenever it is desired to obtain a braking force from the traction motors, a contactor 61 is closed on a contact 62 in circuit with one terminal of the main load absorbing resistor 33. This contactor 61 is connected to the secondary brush 12 of the metadyne transformer through a pair of contacts 63 which normally maintain this circuit open. This circuit, however, is adapted to be closed by a relay contactor 64 arranged to engage the contacts 63 whenever the voltage across the primary brushes of the metadyne transformer falls below a predetermined value. This relay is operated by an exciting coil 65 connected between the primary brushes of the metadyne transformer, and this exciting coil maintains the contactor 64 out of engagement with the contacts 63 when the voltage across the primary brushes of the transformer exceeds a predetermined value. Another pair of contacts 66 of a relay 67 is arranged in circuit between terminal 34 of the main load absorbing resistor 33 and the primary brush 12 of the metadyne transformer. This relay 67 is operated by an exciting coil 68 connected across the primary brushes of a metadyne transformer, so that the relay remains open below a predetermined voltage above which the exciting coil 68 closes a contactor 69 across the contacts 66 to connect the main load absorbing resistor 33 across the primary brushes 11 and 12 of the metadyne transformer. Thus, whenever the system may become disconnected from the source of electrical power supply during regenerative braking, the voltage across the primary brushes of the metadyne transformer will rise and exceed a predetermined value, so that the relay 67 will operate and place the main load absorbing resistor 33 across these primary brushes and provide the power system with a dynamic braking circuit. Furthermore, if a shirt-circuit should occur across the source of electrical power supply, so that the voltage across the primary brushes of the metadyne transformer should fall below a predetermined value during regenerative braking, the under voltage relay coil 65 will be deenergized and the contactor 64 will close the circuit through the contacts 63 and the main load absorbing resistor 33 again will be connected across the primary brushes of the metadyne transformer to provide the desired dynamic braking.

In this type traction power system, it usually is desirable to provide a substantially constant voltage source of power for supplying power to auxiliaries. In the illustrated arrangement, a substantially magnetically saturated auxiliary generator 70 is connected to the metadyne transformer by a mechanical coupling 71 and is driven in a predetermined speed relationship with respect to the transformer. This auxiliary generator is connected across a load which may comprise a heating resistor 72, and also may be used to charge a storage battery 73 connected across the load 72. Whenever the voltage across the primary brushes 11 and 12 of the metadyne transformer falls below a predetermined value during motoring or braking operating conditions, it is desirable that the auxiliary load should be removed from the metadyne transformer. In order to obtain this result, a relay 74 is provided with an exciting coil 75, one terminal of which is connected to the primary brush 11, and the other terminal of which is connected to the contactor 61. In this manner, whenever the voltage across the primary brushes falls below a predetermined value, as to deenergize the exciting coil 65 and close the circuit from the contactor 61 through the contacts 63 and contactor 64 to the primary brush 12, the exciting coil 75 will be energized and operate the relay 74, so as to open the circuit of the auxiliary generator 70 through a pair of contacts 76 and a contactor 77. Under these conditions, the storage battery 73 will be utilized to provide the auxiliary power to the auxiliary load 72, and this arrangement will insure a substantially constant potential source of auxiliary power supply for the auxiliary load.

In Fig. 2 is shown a modification of the power system shown in Fig. 1, wherein a rotary metadyne transformer 10 is arranged to supply power to a pair of "8-connected" motors 18 and 25, provided with the same polarized relay and auxiliary control circuits as in Fig. 1. The various elements in this figure which correspond to elements in Fig. 1 are identified by the same reference numerals. The difference between the two systems shown in these two figures resides in the arrangement for starting the power system when it is connected to the source of electrical power supply for avoiding or limiting excessively large current surges. In some systems, the main load absorbing resistor 33 cannot be arranged to provide adequate dynamic braking facilities and also meet the requirements of a starting resistor, so that separate resistance units must be used to perform these two functions. Under these conditions, the primary brush 11 of the metadyne transformer 10 is connected in series with a starting resistor 78 and a main starting switch 79. When first connecting the power system to the source of electrical power supply, the starting switch 79 is closed and the starting resistance 78 limits the starting current to a safe operating value. When the metadyne transformer 10 has accelerated to such a speed that it generates a back electromotive force of sufficient value to limit the current supplied thereto, a short-circuiting switch 80 is closed across the starting resistance 78, thereby applying full line voltage across the primary brushes 11 and 12 of the metadyne transformer. The remainder of the system shown in this figure is connected in the same manner, and is adapted to operate the same as the power system shown in Fig. 1.

While I have illustrated and described particular embodiments of my invention, modifications thereof will occur to those skilled in the art. I desire it to be understood, therefore, that my invention is not to be limited to the particular arrangements disclosed, and I intend in the appended claims to cover all modifications which do not depart from the spirit and scope of my invention.

What I claim as new and desire to secure by Letters Patent of the United States is:

1. In combination with a metadyne transformer having a primary set of brushes and a secondary set of brushes, a pair of driving motors, means for connecting said motors in figure 8 connection to said metadyne transformer primary and secondary brushes, a main load absorbing means, and voltage responsive means for connecting said main load absorbing means in circuit across said transformer primary brushes when said primary brush voltage exceeds a predetermined value.

2. In combination with a metadyne transformer having a primary set of brushes and a secondary set of brushes, a pair of driving motors, means for connecting said motors in figure 8 connection to said metadyne transformer primary and secondary brushes, an emergency electrical load absorbing means, and means dependent on the electrical potential across said motors for connecting said emergency load absorbing means in circuit between said motors and said transformer brushes when said electrical potential exceeds a predetermined value.

3. In combination with a metadyne transformer having a primary set of brushes and a secondary set of brushes, a pair of driving motors, means for connecting said motors in figure 8 connection to said metadyne transformer primary and secondary brushes, an emergency electrical load absorbing means, means dependent on the electrical potential across said motors for connecting and disconnecting said emergency load absorbing means in circuit between said motors and said transformer brushes, a main load absorbing means, and voltage responsive means for connecting said main load absorbing means in circuit across said transformer primary brushes when said primary brush voltage exceeds a predetermined value.

4. In combination with a metadyne transformer having a primary set of brushes and a secondary set of brushes, a pair of driving motors, means for connecting said motors in figure 8 connection to said metadyne transformer primary and secondary brushes, a main load absorbing means, means dependent on the voltage across said transformer primary brushes for connecting said main load absorbing means in circuit thereacross when said primary brush voltage exceeds a predetermined value, other means for connecting said main load absorbing means in circuit across said transformer primary brushes during regenerative braking and for disconnecting said main load absorbing means therefrom during motoring of said motors, and voltage responsive mean for breaking said last-mentioned circuit when said primary brush voltage falls below a predetermined value.

5. In combination with a metadyne transformer having a primary set of brushes and a secondary set of brushes, a pair of driving motors, means for connecting said motors in figure 8 connection to said metadyne transformer primary and secondary brushes, an emergency electrical load absorbing means, and means dependent on the electrical potential across said motors for connecting said emergency load absorbing means in circuit between said motors and said transformer brushes when said electrical potential exceeds a predetermined value, said connecting means being arranged to maintain said circuit connected during a predetermined voltage relationship between the electrical potential across said motors and said emergency load absorbing means and being arranged to render said emergency load absorbing means substantially ineffective below a predetermined electrical potential across said motors.

6. In combination with a metadyne transformer having a primary set of brushes and a secondary set of brushes, a pair of driving motors, means for connecting said motors in figure 8 connection to said metadyne transformer primary and secondary brushes, a main load absorbing means, means for connecting said main load absorbing means in circuit across said transformer primary brushes in response to said primary brush voltage exceeding a predetermined value and for disconnecting said circuit below a predetermined value of the transformer primary brush voltage, other means for connecting the main load absorbing means in circuit across said transformer primary brushes during regenerative braking and for disconnecting said main load absorbing means therefrom during motoring of said motors, and means dependent on the voltage across said transformer primary brushes for making and breaking said last-mentioned circuit.

7. In combination with a metadyne transformer having a primary set of brushes and a secondary set of brushes, a pair of driving motors, means for connecting said motors in figure 8 connection to said metadyne transformer primary and secondary brushes, an emergency electrical load absorbing means, means dependent on the electrical potential across said motors for connecting and disconnecting said emergency load absorbing means in circuit between said motors and said transformer brushes, a main load absorbing means, means dependent on the voltage across said transformer primary brushes for connecting said main load absorbing means in circuit thereacross when said primary brush voltage exceeds a predetermined value, other means for connecting said main load absorbing means in circuit across said transformer primary brushes during regenerative braking and for disconnecting said main load absorbing means therefrom during motoring of said motors, and means for breaking said last-mentioned circuit when said primary brush voltage falls below a predetermined value.

8. In combination with a metadyne transformer having a primary set of brushes and a secondary set of brushes, a pair of driving motors, means for connecting said motors in figure 8 connection to said metadyne transformer primary and secondary brushes, an emergency electrical load absorbing means, means dependent on the electrical potential across said motors for connecting and disconnecting said emergency load absorbing means in circuit between said motors and said transformer brushes, a main load absorbing means, means for connecting said main load absorbing means in circuit across said transformer primary brushes in response to said primary brush voltage exceeding a predetermined value and for disconnecting said circuit below a predetermined value of the transformer primary brush voltage, other means for connecting the main load absorbing means in circuit across said transformer primary brushes during regenerative braking and for disconnecting said main load absorbing means therefrom during motoring of said motors, and means dependent on the voltage across said transformer primary brushes for making and breaking said last-mentioned circuit.

9. A power system including a source of electrical power supply, an armature reaction excited dynamo-electric transformer having a commutator with a pair of primary brushes and a pair of secondary brushes electrically displaced from said primary brushes, means for connecting said primary brushes across said source of electrical power supply, a pair of driving motors, means for connecting one of said driving motors across a brush of said primary brushes and a brush of said secondary brushes, other means for connecting the other of said driving motors across the other brush of said pair of primary brushes and the other brush of said pair of secondary brushes, a main electrical load absorbing means, and means dependent on the electrical potential across said primary brushes for connecting and disconnecting said main load absorbing means to said primary brushes.

10. A power system including a source of electrical power supply, a metadyne transformer having a primary set of brushes and a secondary set of brushes, a pair of driving motors, means for connecting said motors in figure 8 connection to said metadyne transformer primary and secondary brushes, means for connecting said transformer primary brushes across said source of electrical power supply, means including a starting resistance for reducing current surges when connecting said primary brushes to said source of electrical power supply, means for rendering effective and ineffective said current surge reducing means, a main load absorbing means, and means for connecting said main load absorbing means in circuit with said transformer primary brushes in response to said primary brush voltage exceeding a predetermined value.

11. A power system including a source of electrical power supply, a metadyne transformer having a primary set of brushes and a secondary set of brushes, means for connecting said primary brushes across said source of electrical power supply, a pair of driving motors, means for connecting said driving motors in figure 8 connection to said metadyne transformer primary and secondary brushes, means for reducing current surges when connecting said transformer primary brushes to said source of electrical power supply, an emergency electrical load absorbing means, means dependent on the electrical potential across said motors for connecting and disconnecting said emergency load absorbing means in circuit between said motors and said transformer brushes, a main load absorbing means, and means dependent upon the voltage across said transformer primary brushes for connecting and disconnecting said main load absorbing means in circuit across said primary brushes.

12. A power system including a source of electrical power supply, an armature reaction excited dynamo-electric transformer having a commutator with a pair of primary brushes and a pair of secondary brushes electrically displaced from said primary brushes, means for connecting said primary brushes across said source of electrical power supply, a pair of driving motors, means for connecting one of said driving motors across a brush of said primary brushes and a brush of said secondary brushes, other means for connecting the other of said driving motors across the other brush of said pair of primary brushes and the other brush of said pair of secondary brushes, a main electrical load absorbing means, means in circuit with said main load absorbing means for connecting said main load absorbing means across said primary brushes, and other means dependent on the electrical potential across said primary brushes for connecting and disconnecting said main load absorbing means to said primary brushes.

13. A power system including a source of electrical power supply, an armature reaction excited dynamo-electric transformer having a commutator with a pair of primary brushes and a pair of secondary brushes electrically displaced from said primary brushes, means for connecting said primary brushes across said source of electrical power supply, a pair of driving motors, means for connecting one of said driving motors across a brush of said primary brushes and a brush of said secondary brushes, other means for connecting the other of said driving motors across the other brush of said pair of primary brushes and the other brush of said pair of secondary brushes, a main electrical load absorbing means, means in circuit with said main load absorbing means for connecting said main load absorbing means across said primary brushes, means dependent on the electrical potential across said primary brushes for opening and closing the circuit of said main load absorbing means circuit connecting means, and other means dependent on the electrical potential across said primary brushes for connecting and disconnecting said main load absorbing means to said primary brushes independently of said first-mentioned main load absorbing means connecting means.

14. A power system including a source of electrical power supply, an armature reaction excited dynamo-electric transformer having a commutator with a pair of primary brushes and a pair of secondary brushes electrically displaced from said primary brushes, means for connecting said primary brushes across said source of electrical power supply, a pair of driving motors, means for connecting one of said driving motors across a brush of said primary brushes and a brush of said secondary brushes, other means for connecting the other of said driving motors across the other brush of said pair of primary brushes and the other brush of said pair of secondary brushes, an emergency electrical load absorbing means, means dependent on the electrical potential across said one of said driving motors for inserting said emergency load absorbing means in circuit with said one of said motors between said motor and said dynamo-electric transformer brushes and for removing said emergency load absorbing means from said circuit, a main electrical load absorbing means, and means dependent on the electrical potential across said primary brushes for connecting and disconnecting said main load absorbing means to said primary brushes.

15. A power system including a source of electrical power supply, an armature reaction excited dynamo-electric transformer having a commutator with a pair of primary brushes and a pair of secondary brushes electrically displaced from said primary brushes, means for connecting said primary brushes across said source of electrical power supply, a pair of driving motors, means for connecting one of said driving motors across a brush of said primary brushes and a brush of said secondary brushes, other means for connecting the other of said driving motors across the other brush of said pair of primary brushes and the other brush of said pair of secondary brushes, an emergency electrical load absorbing means, means dependent on the electrical potential across said one of said driving motors for inserting said emergency load absorbing means in circuit with said one of said motors between said motor and said dynamo-electric transformer brushes and for removing said emergency load absorbing means from said circuit, a main electrical load absorbing means, means in circuit with said main load absorbing means for connecting said main load absorbing means across said primary brushes, means dependent on the electrical potential across said primary brushes for connecting and disconnecting said main load absorbing means to said primary brushes independently of said first-mentioned main load absorbing means connecting means, and means for connecting and disconnecting said primary brushes through said main load absorbing means across said source of electrical power supply to reduce current surges when connecting said primary brushes to said source of electrical power supply.

16. A power system including a source of electrical power supply, an armature reaction excited dynamo-electric transformer having a commutator with a pair of primary brushes and a pair of secondary brushes electrically displaced from said primary brushes, means for connecting said primary brushes across said source of electrical power supply, a pair of driving motors, means for connecting one of said driving motors across a brush of said primary brushes and a brush of said secondary brushes, other means for connecting the other of said driving motors across the other brush of said pair of primary brushes and the other brush of said pair of secondary brushes, an emergency electrical load absorbing means, means dependent on the electrical potential across said one of said driving motors for inserting said emergency load absorbing means in circuit with said one of said motors between said motor and said dynamo-electric transformer brushes and for removing said emergency load absorbing means from said circuit, a main electrical load absorbing means, means in circuit with said main load absorbing means for connecting said main load absorbing means across said primary brushes, and means for connecting and disconnecting said primary brushes through said main load absorbing means across said source of electrical power supply to reduce current surges when connecting said primary brushes to said source of electrical power supply.

17. A power system including a source of electrical power supply, an armature reaction excited dynamo-electric transformer having a commutator with a pair of primary brushes and a pair of secondary brushes electrically displaced from said primary brushes, means for connecting said primary brushes across said source of electrical power supply, a pair of driving motors, means for connecting one of said driving motors across a brush of said primary brushes and a brush of said secondary brushes, other means for connecting the other of said driving motors across the other brush of said pair of primary brushes and the other brush of said pair of secondary brushes, an emergency electrical load absorbing means, means dependent on the electrical potential across said one of said driving motors for inserting said emergency load absorbing means in circuit with said one of said motors between said motor and said dynamo-electric transformer brushes and for removing said emergency load absorbing means from said circuit, a main electrical load absorbing means, means dependent on the electrical potential across said primary brushes for connecting and disconnecting said main load absorbing means to said primary brushes, and means for connecting and disconnecting said primary brushes through said main load absorbing means across said source of electrical power supply to reduce current surges when connecting said primary brushes to said source of electrical power supply.

18. A power system including a source of electrical power supply, an armature reaction excited dynamo-electric transformer having a commutator with a pair of primary brushes and a pair of secondary brushes electrically displaced from said primary brushes, means for connecting said primary brushes across said source of electrical power supply, a pair of driving motors, means for connecting one of said driving motors across a brush of said primary brushes and a brush of said secondary brushes, other means for connecting the other of said driving motors across the other brush of said pair of primary brushes and the other brush of said pair of secondary brushes, an emergency electrical load absorbing means, means dependent on the electrical potential across said one of said driving motors for inserting said emergency load absorbing means in circuit with said one of said motors between said motor and said dynamo-electric transformer brushes and for removing said emergency load absorbing means from said circuit, a main electrical load absorbing means, means in circuit with said main load absorbing means for connecting said main load absorbing means across said primary brushes, means dependent on the electrical potential across said primary brushes for opening and closing the circuit of said main load absorbing means circuit connecting means, an auxiliary electric generator mechanically driven by said dynamo-electric transformer, an auxiliary electrical load, and means dependent on the electrical potential across said primary brushes for connecting and disconnecting said auxiliary electrical load to said auxiliary generator.

19. A power system including a source of electrical power supply, an armature reaction excited dynamo-electric transformer having a commutator with a pair of primary brushes and a pair of secondary brushes electrically displaced from said primary brushes, means for connecting said primary brushes across said source of electrical power supply, a pair of driving motors, means for connecting one of said driving motors across a brush of said primary brushes and a brush of said secondary brushes, other means for connecting the other of said driving motors across the other brush of said pair of primary brushes and the other brush of said pair of secondary brushes, an emergency electrical load absorbing means including a braking resistor, means dependent on the electrical potential across said one of said driving motors for inserting said emergency load absorbing means in circuit with said one of said motors between said motor and said dynamo-electric transformer brushes and for removing said emergency load absorbing means from said circuit, a main electrical load absorbing means including a main load resistor, means in circuit with said main load absorbing means for connecting said main load absorbing means across said primary brushes, means dependent on the electrical potential across said primary brushes for opening and closing the circuit of said main load absorbing means circuit connecting means, and means dependent on the electrical potential across said primary brushes for connecting and disconnecting said main load absorbing means to said primary brushes independently of said first-mentioned main load absorbing means connecting means.

20. A power system including a source of electrical power supply, an armature reaction excited dynamo-electric transformer having a commutator with a pair of primary brushes and a pair of secondary brushes electrically displaced from said primary brushes, means for connecting said primary brushes across said source of electrical power supply, a pair of driving motors, means for connecting one of said driving motors across a brush of said primary brushes and a brush of said secondary brushes, other means for connecting the other of said driving motors across the other brush of said pair of primary brushes and the other brush of said pair of secondary brushes, an emergency electrical load absorbing means including a braking resistor, means dependent on the electrical potential across one of said driving motors for inserting said emergency load absorbing means in circuit with said one of said motors between said motor and said dynamo-electric transformer brushes and for removing said emergency load absorbing means from said circuit, a main electrical load absorbing means including a main load resistor, means in circuit with said main load absorbing means for connecting said main load absorbing means across said primary brushes, means dependent on the electrical potential across said primary brushes for opening and closing the circuit of said main load absorbing means circuit connecting means, means dependent on the electrical potential across said primary brushes for connecting and disconnecting said main load absorbing means to said primary brushes independently of said first-mentioned main load absorbing means connecting means, means for connecting said primary brushes through said main load absorbing means across said source of electrical power supply to reduce current surges when connecting said primary brushes to said source of electrical power supply, an auxiliary electric generator mechanically driven by said dynamo-electric transformer, an auxiliary electrical load, and means dependent on the electrical potential across said primary brushes for connecting and disconnecting said auxiliary electrical load to said auxiliary generator.

JOSEPH M. PESTARINI.